United States Patent [19]

De Hart

[11] 3,984,774

[45] Oct. 5, 1976

[54] ANTIJAM COMMUNICATIONS SYSTEM

[75] Inventor: Willis D. De Hart, Alexandria, Va.

[73] Assignee: The United States of America as represented by the Secretary of the Navy, Washington, D.C.

[22] Filed: Jan. 14, 1959

[21] Appl. No.: 786,896

[52] U.S. Cl. .................................... 325/52; 325/65

[51] Int. Cl.² ........................................ H04B 1/12

[58] Field of Search .................. 250/6.9, 6.47, 8.35, 250/6.6; 179/1.8; 332/37 D; 330/149, 75, 145, 107; 325/52, 65

[56] References Cited

UNITED STATES PATENTS

| | | | |
|---|---|---|---|
| 1,519,211 | 12/1924 | Martin | 330/107 |
| 2,070,666 | 2/1937 | Lewellyn | 250/6.47 |
| 2,253,976 | 8/1941 | Guanella | 330/75 |
| 2,418,119 | 4/1947 | Hansen | 250/6.6 |
| 2,463,502 | 3/1949 | Atkins | 250/6.6 |
| 2,473,983 | 6/1949 | Wolf | 330/107 |
| 3,001,064 | 9/1961 | Alexis et al. | 325/65 |

FOREIGN PATENTS OR APPLICATIONS

| | | | |
|---|---|---|---|
| 886,340 | 6/1943 | France | 250/6.9 |

*Primary Examiner*—Howard A. Birmiel
*Attorney, Agent, or Firm*—Q. E. Hodges

EXEMPLARY CLAIM

1. An antijam, two-way communications station comprising a radiant energy transmitter and receiver, a signal source connected to said transmitter, a signal subtractor having one input connected to said signal source, another input connected to said receiver and an output, means for selectively connecting said transmitter to said receiver and the output of said signal source for establishing a degenerative feedback loop for noise-free transmission and reception with another station of substantially the same type.

6 Claims, 4 Drawing Figures

INVENTOR

WILLIS D. DeHART

BY B. L. Zangwill
W. O. Quesenberry

ATTORNEY

INVENTOR
WILLIS D. DeHART
BY B. L. Zangwill
W. O. Quesenberry
ATTORNEY

INVENTOR

WILLIS D. DeHART

B. L. Zangwill

BY W. O. Quesenbery

ATTORNEY

INVENTOR
WILLIS D. DeHART

B. L. Zangwill
BY W. O. Quesenberry
ATTORNEY

ANTIJAM COMMUNICATIONS SYSTEM

The invention described herein may be manufactured and used by or for the Government of the United States of America for governmental purposes without the payment of any royalties thereon or therefor.

This invention relates to an antijam communications system and more particularly to a method and apparatus for receiving signals in the presence of random noise that may be higher in level than that of the signal.

This invention employs degenerative feedback applied to the noise in a system and therefore may be used in combination with an amplifier to reduce the noise level in the amplifier without reducing the signal level or gain.

In the past the only method of reducing the effects of jamming was to generate a larger signal at the receiver than that of the jammer.

A primary object of this invention is to provide a system that will provide positive communication when the jamming signal at the receiver input is as high as 50 db above the intelligence signal level.

Many communication systems provide a degree of security from interception, but require special equipment at both the transmit and receive end, and are subject to loss in security if the unintended receiver has knowledge of the system or identical equipment.

Another object of this invention, therefore, is to provide a communication system, which may be wire or wireless without requiring special equipment, which is secure from interception even when the unintended receiver has full knowledge of the system and identical equipment.

In order to positively receive a message in the presence of high noise fields, systems have been proposed which use the principle of a signal redundancy to improve the signal to noise ratio. The average strength of the signal is increased, the signal is repeated, or the signal speed is reduced.

Another object of this invention is therefore to provide a communications system which will positively receive a signal without an increase in signal power, repetition of the signal, or reduction in the signal speed.

Other objects and advantages of the invention will hereinafter become more fully apparent from the following description of the annexed drawings, which illustrate a preferred embodiment, and wherein.

Figure 1:
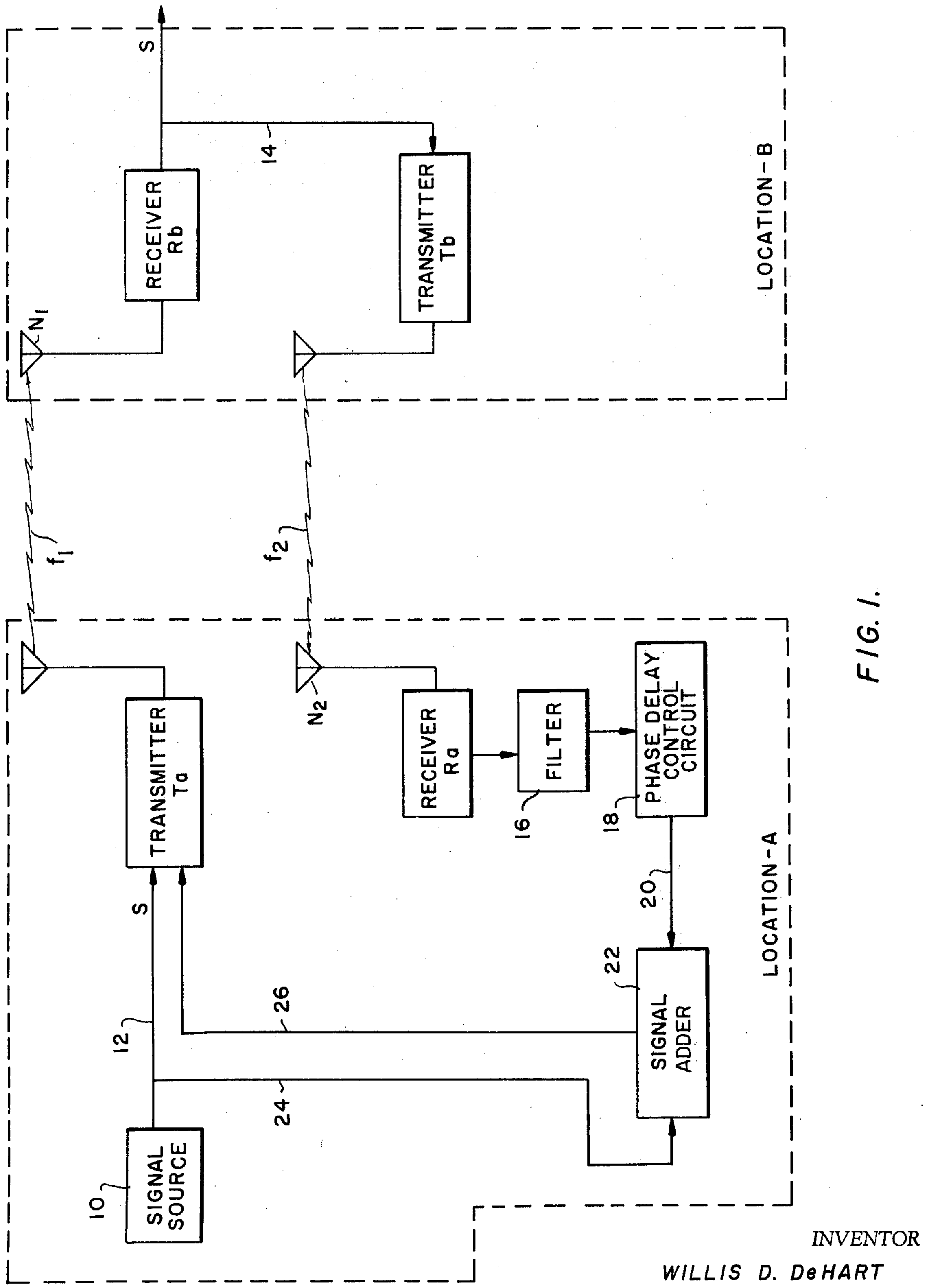
FIG. 1 is a schematic diagram of a preferred embodiment of the invention using a radiant energy link for one way transmission.

Referring now to the drawings, wherein like reference characters designate like or corresponding parts throughout the several views, there is shown in FIG. 1 a signal source 10 generating signal S connected to a transmitter $T_a$ of a first station at location A by line 12. Transmitter $T_a$ transmits to receiver $R_b$ of a second station at location B on channel $f_1$. The output of receiver $R_b$ is coupled to transmitter $T_b$ by line 14 and then transmitted on frequency $f_2$ to receiver $R_a$ at location A, whereby a loop may be formed by the further connection of receiver $R_a$ to transmitter $T_a$.

Frequencies $f_1$ and $f_2$ are separated by a small amount, such as 10%, so that the propagation conditions are similar for the duplex channels.

The audio output of receiver $R_b$ comprising signal S also appears on line 14.

The detected output of receiver $R_a$ is coupled to the input of a filter 16, and thence from the filter to a phase delay control circuit 18. The output of the phase delay control circuit 18 is coupled by line 20 to one of two inputs to the signal adder 22. The other input to the signal adder 22 is coupled by line 24 from the original signal source 10. The output of the signal adder or subtractor 22 is coupled to the input of transmitter $T_a$ by line 26.

It is the purpose of the filter 16 to eliminate frequencies above and below the signal frequencies, that will cause regeneration. It is the purpose of the phase delay control circuit 18 to delay the signal from receiver $R_a$ by an amount that will cause the output from the phase delay control circuit 18 to be 180° out of phase with respect to the other input S on line 24 to the signal adder 22. The two inputs to the signal adder are adjusted to be equal in amplitude and 180° out of phase and then the output of the signal adder 22 will be zero. The phase delay control circuit 18 and the adder 22 together act as a subtractor.

Noises $N_1$ and $N_2$ that occur within the received band width of the signal at receivers $R_b$ and $R_a$ will be transmitted around the loop with the signal S to the signal adder 22 and the output of the signal adder will contain noise that is 180° out of phase with respect to the noise input to the receivers and will have an amplitude that, when multiplied by the gain of the transmitters and receivers, will be equal in amplitude at the received points.

In other words, noise generated at the front end of the receivers will produce a noise at the input to transmitter $T_a$ that will tend to cancel the original noise. This is a modified degenerative feedback loop applied to communications practices.

This degenerative feedback loop is superior to all others known, in that, this degenerative feedback loop does not tend to reduce the gain of the loop in so far as the signal is concerned. The degenerative feedback applies only to noise.

If noises $N_1$ and $N_2$ are caused by jamming, the effectiveness of this system against such noises are a function only of the gain achieved in the loop.

If purely random noise is intentionally introduced anywhere in the loop (for example in receiver $R_b$) the noise will be transmitted as a part of the signal. For receivers not in the loop this noise could not be degenerated. In a test system, random noise was generated at the front end of receiver $R_b$ by an amount $50_{db}$ above the signal being transmitted by transmitter $T_a$, and at receiver $R_a$ no noticeable noise was present as detected by the ear or as measured on an oscilloscope. However, a receiver that was not within the loop and located at location B could not detect the signal.

The action of degenerative feedback on noise is similar to a filter rejecting the noise with a Q that is a direct function of the gain of the amplifiers. With proper design of the system it is theoretically possible to have reception of a signal approaching the thermal noise level of the receivers.

Signal adder 22 may comprise a pair of triodes having their plates connected to a suitable voltage source, their grids connected to lines 20 and 24 and having their cathodes connected together to a common cathode resistor and to line 26.

Figure 2:
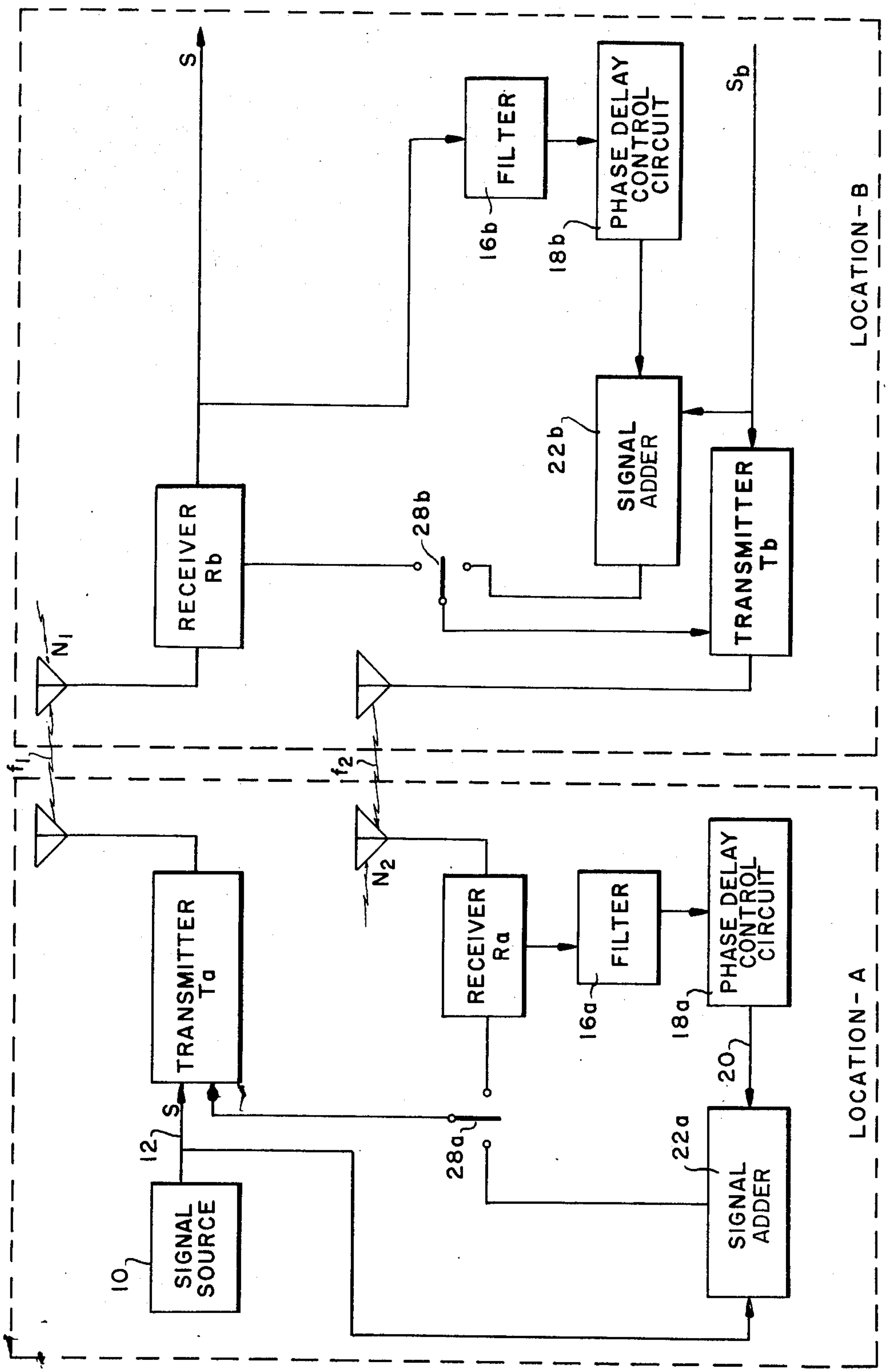
FIG. 2 is a schematic diagram of the invention using a radiant energy link for two way transmission.

Referring to FIG. 2, a two way communication system is shown employing the invention. S signal source 10, line 12, transmitter $T_a$, receiver $R_b$, transmitter $T_b$, receiver $R_a$, filters $16_a$ and $16_b$, phase delay control circuits $18_a$ and $18_b$, and signal adders $22_a$ and $22_b$ are functionally identical with FIG. 1.

Two send-receive switches $28_a$ and $28_b$ allow either location A or location B to selectively transmit and receive.

The system should be amenable to such techniques as frequency and space diversity to avoid the effects of selective fading and multipath in radio communications.

Figure 3:
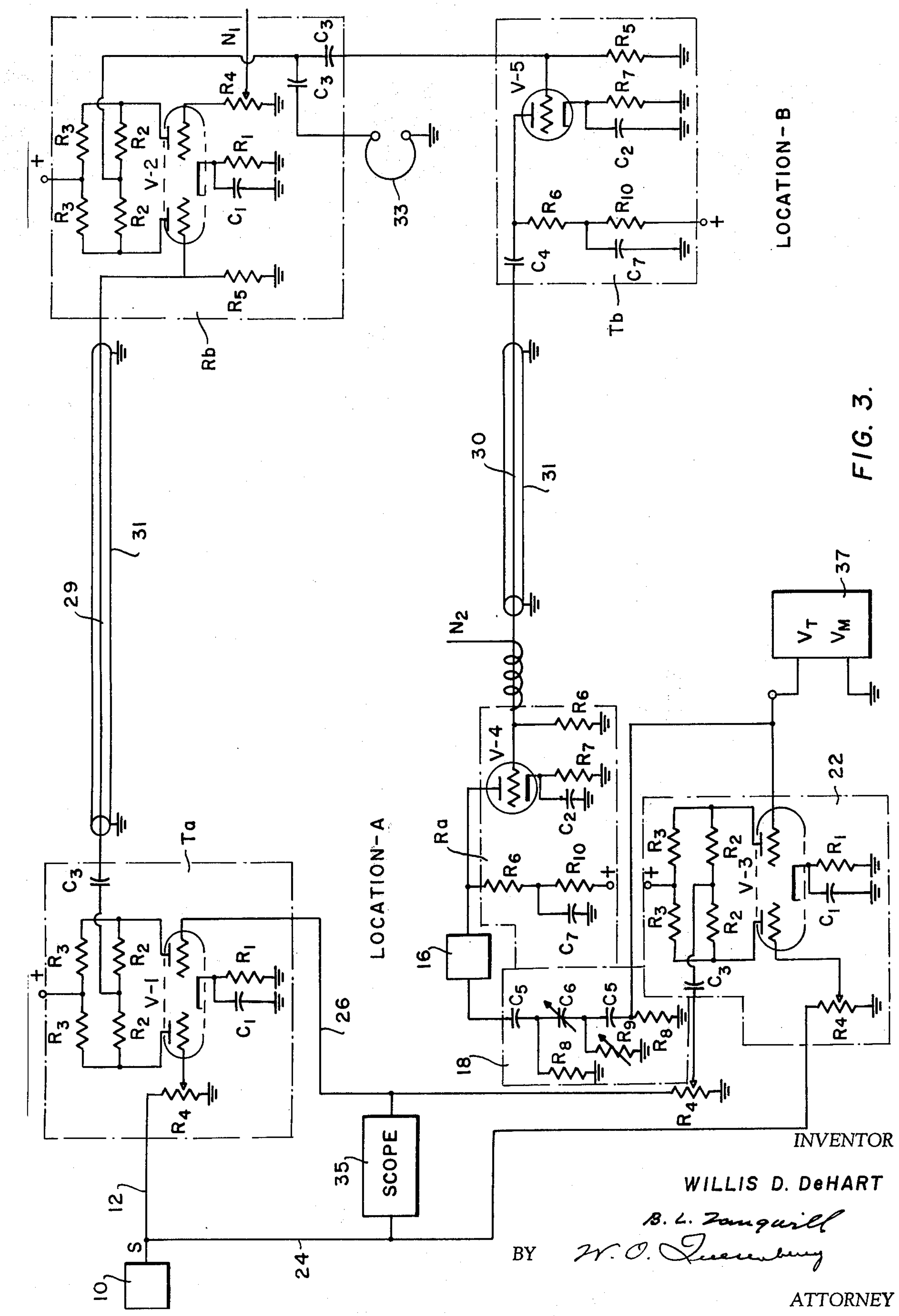
FIG. 3 is a schematic diagram of an actual embodiment of the invention using a wire link.

Referring to FIG. 3, an actual embodiment of the invention is shown using a wire link. S signal source 10, line 12, transmitter $T_a$, receiver $R_b$, transmitter $T_b$, receiver $R_a$, filters 16, phase delay control circuit 18, signal adder 22, and noise source $N_2$ are functionally identical with FIG. 1.

A pair of wire links 29 and 30 having shields 31 were used instead of the radiant energy link of FIG. 1.

The circuit values for the embodiment of FIG. 3 are as follows:

$V_1$, $V_2$, $V_3$ = 6SC7
$V_4$, $V_5$ = ½ - 6 SN7
$R_1$ = 2200 ohm
$R_2 = R_4 = R_5$ = 1 meg ohm
$R_3$ = 270 K ohms
$R_6$ = 100 K ohms
$R_7$ = 2500 ohms
$R_8$ = 3 meg ohms
$R_9$ = 1–5 meg ohms
$R_{10}$ = 100 K ohms
$C_1$ = 10 micro farads
$C_2$ = 5 micro farads
$C_3$ = 0.005 micro farads
$C_4$ = 0.03 micro farads
$C_5$ = 0.0005 micro farads
$C_6$ = 100–500 micro-micro-farads
$C_7$ = 0.5 micro farads Filter 16 is a bandpass filter having a 600–900 cps. bandwidth. Filter 16 and circuit 18 have a 15–20 db loss in the pass band.

The voltage gain of the mixers $V_1$, $V_2$, and $V_3$ is about 15 and of the amplifiers $V_4$ and $V_5$ is about 16.

A high impedance (20,000 ohms) set of headphones 33 was used to detect the output of receiver $R_b$.

In operation with signal S set at 700 cps. $N_1$ at 750 cps., $N_2$ at 800 cps., an oscilloscope 35 was used to set the phase delay control circuit 18 so that the carrier S was zero in line 26. Then from the amplitude of the sweeps and the gain of the oscilloscope 35, and the setting of the various potentiometers, a noise to signal ratio of $35\text{–}40_{db}$, was measured. A vacuum tube voltmeter 37 may also be used to measure the signal and noise amplitudes.

The degenerative noise feedback principle of the present invention applies not only to communication systems but to amplifier circuits as well.

In the degenerative feedback arrangement for amplifiers originated by H. S. Black of Bell Telephone Laboratories, the output signal of the amplifier is fed back as well as the noise generated in amplification. This results in a reduction of noise as well as a reduction of amplification of signal. The net gain in so far as the ratio of signal to noise is concerned is zero.

Figure 4:
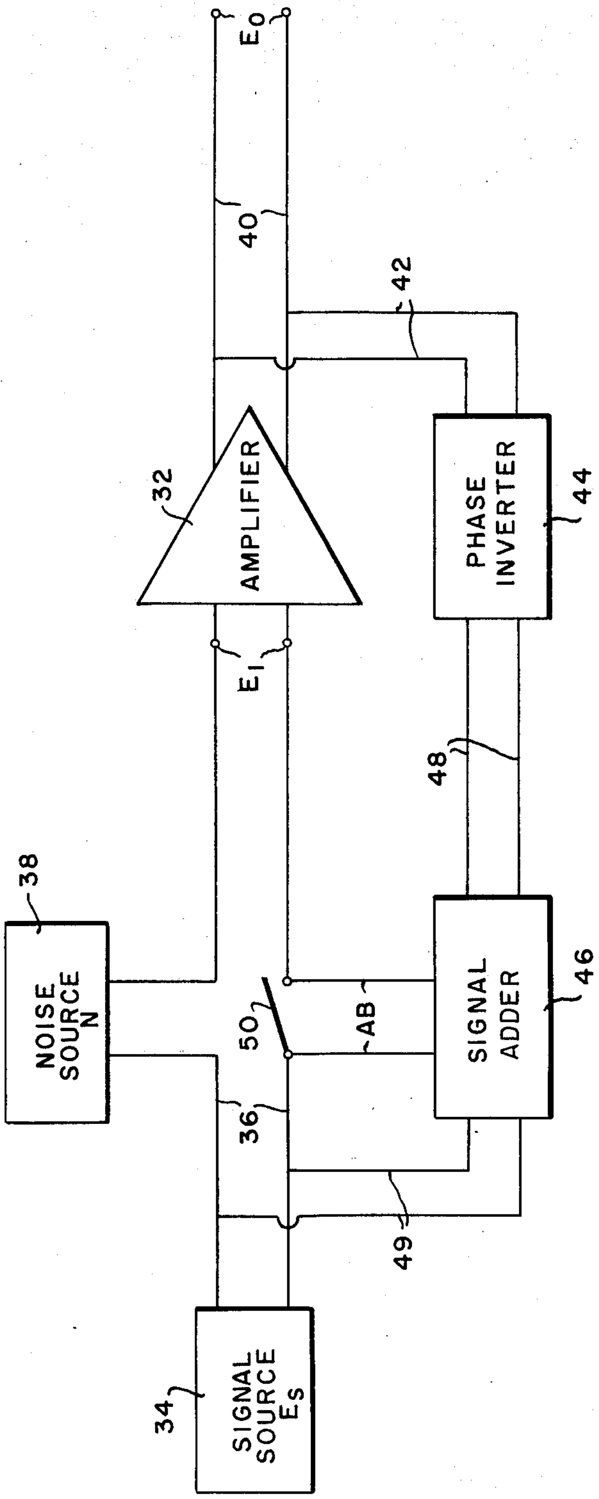
FIG. 4 is a schematic diagram of an amplifier using the invention for noise reduction.

Referring to FIG. 4 an amplifier 32 is shown having a gain A and connected to an input signal $E_s$ from signal source 34 on lines 36. A noise signal N from noise source 38 is also connected to the input $E_1$ of amplifier 32 on lines 36.

The output $E_o$ of the amplifier 32 appears on lines 40 and is fed back on lines 42 to a phase inverter 44. The output of the phase inverter 44 is coupled to one input of a signal adder 46 on lines 48. The other input of the signal adder 46 is connected to signal source 34 by lines 49. The output of the signal adder 46 which is AB, is coupled to switch 50 and lines 36 to establish a feedback loop.

When switch 50 is closed the input $E_1$ to the amplifier equals Es + N; where Es equals the signal voltage and N equals the voltage required to feed into a noise-free amplifier to produce a noise in the output equal to the noise generated in a practical amplifier. When switch 50 is closed, the output voltage of the amplifier equals the gain of the amplifier times the input voltage or;

$$E_o = AE_1$$

or $$E_o = A(Es + N)$$

When switch S is open a voltage AB forms a part of the input voltage $E_1$. Therefore;

$$E_1 = Es + N + AB$$

When the output of the signal adder is adjusted such that;

$$B = -N/A$$

then $$E_o = A\ (Es + N - AN/A)$$

or $$E_o = AEs$$

Phase inverter 44 may comprise a simple amplifier circuit with an amplitude step down device such as a resistance voltage divider or a transformer. The signal adder 46 may comprise a pair of triodes having a common cathode resistor as previously described for signal adder 22.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. An antijam, two-way communications station comprising a radiant energy transmitter and receiver, a signal source connected to said transmitter, a signal subtractor having one input connected to said signal source, another input connected to said receiver and an output, means for selectively connecting said transmitter to said receiver and the output of said signal source for establishing a degenerative feedback loop for noise-free transmission and reception with another station of substantially the same type.

2. An antijam communications system for transmitting a signal in the presence of noise that may be larger than said signal comprising a signal source, a first transmitter connected to said signal source and a first receiver at a first location, a second transmitter and a second receiver at a second location, a first communications channel connected between said first transmitter and second receiver, a second communications channel connected between said second transmitter and first receiver, means for connecting said second receiver to said second transmitter and also including a signal output, a filter connected to said first receiver for eliminating frequencies above and below the frequencies of the signal that may cause regeneration, a phase delay control circuit connected to said filter for delaying the signal from said filter by an amount such that the delay time around said system will be equal to a 180° phase shift of said signal, a signal adder connected to said signal source and said phase delay control circuit for adding the 180° phase shifted signal to said signal to provide an output connected to said first transmitter which has only the noise generated within said system shifted by 180° of said signal whereby the effect of the noise in said system on the audio output in said system may be effectively reduced.

3. An antijam communication method for transmitting and receiving a desired signal which is subjected to superimposed noise in a communication channel, comprising the steps of: generating the desired signal at a communication station; transmitting said desired signal from said communication station to a transmitting station; transmitting said desired signal from said transmitting station to a receiving station through said communication channel; receiving said desired signal and said superimposed noise at said receiving station; transmitting said desired signal and said superimposed noise from said receiving station to said communication station; receiving said desired signal and said superimposed noise at said communication channel; subtracting said received desired signal and superimposed noise from the desired signal being generated at said communication station so that said desired signals cancel each other and leave an inverted noise signal; and transmitting said inverted noise signal to said transmitting station with said desired signal which is generated at said communication station.

4. Apparatus for reducing noise in a signal communication system without a corresponding reduction in signal strength, comprising:

a signal-carrying channel;

a source of essentially noise free signals coupled to said channel;

amplification means located in said channel, by which means undesired noise components are introduced into said channel;

feedback means for said system, said feedback means comprising:

signal adder means having an output and two input paths;

phase shift means having an input coupled to said channel at a point containing the undesired noise components and an output coupled to one input of said signal adder means, whereby the entire signal and the undesired noise components fed to said adder means are essentially inverted;

means coupling said source of signals to the other input of said adder means, whereby upon algebraic addition of the signals from said source and the inverted signals containing noise components, there is produced at the output of said adder means inverted noise signals only;

and means coupling the output of said adder means to a point in said channel at which noise components are essentially absent, whereby the inverted noise components are fed via said channel to cancel the undesirable noise components introduced in said channel.

5. Apparatus according to claim 4 wherein said feedback means includes filter means for excluding frequencies not within a band composing the signals from said source.

6. A method of reducing the effect of noise which is imposed upon a signal when it is transmitted through a communication channel, comprising the steps of: receiving said signal and noise from said communication channel; subtracting said received signal and noise from said signal which has not been sent through said communication channel, whereby said signals cancel each other leaving an inverted form of said noise; and transmitting said inverted form of said noise through said communication channel with said signal, whereby the effect of said noise imposed upon said signal when it is transmitted through a communication channel is reduced.

* * * * *